United States Patent
Watanabe et al.

[11] Patent Number: 6,144,650
[45] Date of Patent: Nov. 7, 2000

[54] MOBILE COMMUNICATION SYSTEM

[75] Inventors: Masatoshi Watanabe, Kawasaki; Osamu Kato, Yokohama, both of Japan

[73] Assignee: Matsushita Electric Industrial Co., Ltd., Osaka, Japan

[21] Appl. No.: 08/937,397

[22] Filed: Sep. 25, 1997

[51] Int. Cl.[7] .................................................. H04J 13/00
[52] U.S. Cl. .......................................... 370/335; 370/514
[58] Field of Search .................................. 370/280, 335, 370/342, 491, 514

[56] References Cited

U.S. PATENT DOCUMENTS

| | | | |
|---|---|---|---|
| 5,673,260 | 9/1997 | Umeda et al. | 370/342 |
| 5,819,165 | 10/1998 | Hulkko et al. | 455/126 |
| 5,832,368 | 11/1998 | Nakano et al. | 455/63 |
| 5,933,782 | 8/1999 | Nakano et al. | 455/522 |

*Primary Examiner*—Melvin Marcelo
*Attorney, Agent, or Firm*—Brown Raysman Millstein Felder & Steiner LLP

[57] ABSTRACT

In a CDMA/TDD cellular system, time necessary for a mobile station to carry out initial synchronization, judgment of the most preferable base station, and acquisition of synchronization of a long code is shortened. A reception base band processing portion 27 reproduces perch channel data from received signals using symbol timing acquired by a synchronous circuit 28. The synchronous circuit 28 detects a unique word from the perch channel data to acquire slot synchronization. A reception level detection circuit 29 judges a base station using a short code of the maximum acquired reception level in the perch channel data to be the nearest. A base station transmits perch channel data in which information with respect to frame timing and information with respect to the kind of a long code used in down communication channel data are interpolated. The synchronous circuit 28 receives the information, acquires frame synchronization, and, using the information with respect to the kind of the long code, acquires long code synchronization.

8 Claims, 8 Drawing Sheets

Perch Channel Data

Perch Channel Data

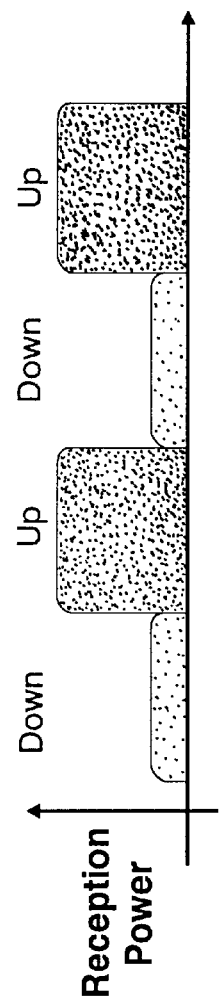
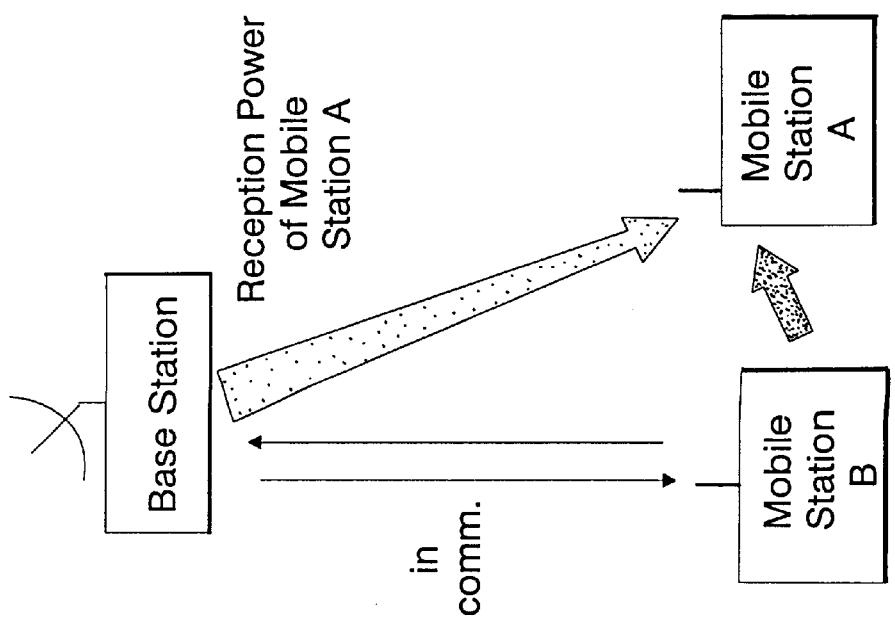
Figure 8b
Figure 8a

MOBILE COMMUNICATION SYSTEM

BACKGROUND OF THE INVENTION

1. Field of the Invention

The present invention relates to a mobile communication system for use in a cellular wireless communication system of digital mobile telephones, portable telephones, and the like.

2. Description of the Related Art

CDMA (Code Division Multiple Access) is one of the techniques for multiple access when a plurality of stations are simultaneously in communication in the same frequency band. There are other known techniques such as FDMA (Frequency Division Multiple Access) and TDMA (Time Division Multiple Access), and compared with these techniques, CDMA is advantageous in that a frequency band is used more efficiently, and thus, that CDMA is available for more subscribers.

CDMA is a technique for carrying out multiple access utilizing spread spectrum communication where a spectrum of information signal is spread over a sufficiently wider band than the original bandwidth in transmission. Spread Spectrum-Direct Sequence (SS-DS) is a method of spreading a spectrum by directly multiplying an information signal by a spread code. Signals from a plurality of mobile stations are multiplexed in the same frequency band and in the same time period.

TDD (Time Division Duplex) is a system where the same band is used both for transmission and for reception, and is sometimes referred to as the ping-pong system. In TDD, the same radio frequency is time shared to transmission/reception to carry out communication. On the other hand, FDD (Frequency Division Duplex) is a system where a frequency used for transmission and a frequency used for reception are different in carrying out communication. FIG. 7A conceptually illustrates TDD, while FIG. 7B conceptually illustrates FDD. In FIG. 7A, at a time T1, a base station transmits data and a mobile station receives data, while, at the subsequent time T2, the mobile station transmits data and the base station receives data. By repeating the cycle, communication using the same frequency band is implemented. In FIG. 7B, in a frequency f1, a base station transmits data and a mobile station receives data, while, in a frequency f2, the mobile station transmits data and the base station receives data.

In SS-DS CDMA, there is a problem that, when a desired transmitting station is far away and an undesired transmitting station (interfering station) is nearby, the power of signals received from the interfering transmitting station is higher than that received from the desired transmitting station, and the mutual correlation between the spread codes can not be suppressed simply with the process gain (spread gain), leading to incapability of communication. This problem is "a problem of distance." Therefore, in an SS-DS CDMA cellular system, it is essential to control transmission power according to the status of the respective transmission lines in up circuits from mobile stations to a base station.

Also, as measured against fading, which is a cause of degradation of communication quality in terrestrial mobile communication, a method for compensating for instantaneous value fluctuation of reception power by controlling transmission power has been proposed.

Methods for controlling transmission power in CDMA/TDD are disclosed in theses entitled "REVIEW OF TRANSMISSION POWER CONTROL IN CDMA/TDD TRANSMISSION" (Miya, Hayashi, and Katoh, IEICE Spring Conference, 1994, B-418) and "POWER CONTROL IN PACKETS SWITCHED TIME DIVISION DUPLEX SEQUENCE SPREAD SPECTRUM COMMUNICATIONS" (R. Esmailzadeh, M. Nakagawa, and A. Kajiwara, Proc. of VTC '92, pp. 989–992, 1992). Fading is symmetrical in that fluctuation in transmission/reception is the same in a single frequency band. Therefore, CDMA/TDD is characterized in that, by using open loop transmission power control where the power of received signals is detected, the status of propagation is grasped, and a transmission power level is determined to transmit data, transmission power control can be carried out in a simpler way, at a higher speed, and more precisely, compared with FDD.

In CDMA, it is effective in increasing the capacity of communication to use codes of high orthogonality as spread codes. However, Walsh codes and orthogonal Gold codes, which are known as codes of high orthogonality are limited in their number to the same number as the code length. Therefore, in order to secure a sufficient number of spread codes to be allotted to the users, products of short codes the periods of which are the same as the symbol lengths of information by long codes the periods of which are longer than those of the short codes are used (U.S. Pat. No. 5,103,459). In this case, by making one base station used only one long code and by allotting different long codes to the respective base stations, the orthogonality of all users in one cell is secured. Further, since signals of other cells are spread using different long codes, these signals become noises. As a result, mutual interference is reduced.

In a cellular system, when a mobile station is switched on, or even when communication with a base station is disconnected, it is necessary to specify the nearest base station to carry out best communication. This is called judgment of the most preferable base station.

In a CDMA cellular system, in the judgment of the most preferable base station or when, according to movement of a mobile station during communication, a base station to which the communication is handed over is specified, conventionally, for example, all base stations transmit pilot channel data spread using the same spread code with offset phases (timing) so as to avoid alignment, and the mobile station correlatively detects all the phases of the spread code of received pilot channel data and specified as the nearest a base station transmitting data with a phase of the largest value of correlation (U.S. Pat. No. 4,901,307), or, base channels transmit perch channel data where different spread codes are allotted to the perch channel data of different base stations, and the mobile station receives perch channel data of all base stations and specifies the nearest base station by measuring the levels of the data.

In case judgment of the most preferable base station is made in a CDMA/TDD cellular system, a mobile station has to first acquire synchronization with respect to the TDD period (slot), specify the time of transmission by a base station, and acquire synchronization with respect to the spread code. Especially when another nearby mobile station is in communication, the transmission power of the nearby mobile station is dominant over that of signals to be received, which is an obstacle to acquisition of initial synchronization. However, up to now, no solution to this problem has been presented.

Further, in case product of a long code by a short code is used as a spread code, since it is also necessary to acquire synchronization with respect to the short code and the long code, time necessary to carry out synchronization and the judgment of the most preferable base station increases.

The present invention is made to solve the problems mentioned in the above, and it is an object of the present invention to provide a mobile communication system for a CDMA/TDD cellular system with long codes and short codes being used as spread codes which allows high-speed initial synchronization and judgment of the most preferable base station and high-speed acquisition of synchronization with respect to the long codes.

SUMMARY OF THE INVENTION

In order to attain the above object, according to the present invention, in a mobile communication system having mobile stations and base stations for communication according to CDMA/TDD, the base stations transmit perch channel data where short codes different between adjacent base stations are used as spread codes and communication channel data for transmitting user information where products of short codes by long codes are used as spread codes, and a fixed bit pattern for synchronization and information with respect to a long code the base station concerned uses are interpolated with respect to every slot in perch channel data, and a plurality of slots form a frame.

A mobile station carries out initial synchronization by receiving perch channel data, specifies the nearest base station by measuring reception power levels of perch channel data with respect to all base stations, and acquires synchronization of the long code of communication channel data using frame timely acquired when perch channel data is received and using perch channel data.

According to an aspect of the present invention, a mobile communication system having a plurality of base stations and a plurality of mobile stations comprising means for communicating according to CDMA/TDD, the minimum time unit of continuous transmission in TDD thereof being a slot, is characterized in that the plurality of base stations comprise means for transmitting perch channel data where a unique word for synchronization consisting of a fixed bit pattern is interpolated with respect to every slot, and the plurality of mobile stations have an AGC function for controlling for received signals at a constant level and comprise means for receiving perch channel data and acquiring slot synchronization and symbol synchronization. By making the received signals at a constant level by the AGC function, acquiring synchronization of the spread codes of perch channel data, and detecting the unique words, the reception zones of TDD are specified and initial synchronization can be carried out at a high speed.

According to another aspect of the present invention, in the mobile communication system of the above aspect, the timing of slots align with each other among the plurality of base stations, the means for transmitting perch channel data of the plurality of base stations use spread codes different between base stations adjacent to each other, and the plurality of mobile stations comprise means for specifying the nearest base station by measuring reception power level of perch channel data with respect to all of the plurality of base stations. Together with the action according to the above aspect, when reception power levels from the respective base stations are measured, by using TDD timing of the base station the synchronization of which was first acquired in receiving data from the second and later base stations, judgment of the most preferable base station can be made at a high speed.

According to still another aspect of the present invention, in the mobile communication system of the second aspect, the plurality of base stations comprise means for transmitting perch channel data, frame information of a frame consisting of a plurality of slots being interpolated therein, and means for transmitting communication channel data for transmitting user information, the means for transmitting perch channel data uses as spread codes short codes different between base stations adjacent to each other, the means for transmitting communication channel data uses as spread codes products of the short codes by long codes allotted so as to be in one-to-one relation with the base stations, the period thereof being equal to the frame, and the mobile stations comprises means for receiving frame information interpolated in perch channel data and means for acquiring synchronization of the long codes of communication channel data using the timing of the acquired frame. Together with the action according to the second aspect, since perch channel data is spread only using the short codes, synchronization of the spread codes can be acquired at a higher speed than in case of the long codes, and, since the fr ames the perch channel data align with the periods and timing of the long codes, by receiving perch channel data and reproducing the timing of the frames in the mobile stations, synchronization of the long codes can be acquired easily.

According to further aspect of the present invention, in the mobile communication system of the third aspect, the means for transmitting perch channel data of the base stations has a function for transmitting information with respect to the kind of said long codes used in communication channel data, using perch channel data, and the plurality of mobile stations comprise means for acquiring synchronization of the long codes of communication channel data using the information with respect to the kind of the long codes of perch channel data. Together with the action according to the third aspect, since the mobile stations are notified of the long codes used by the respective stations by perch channel data, it is not necessary for the mobile stations to store the long codes, and thus, change of the spread codes and the like are handled flexibly.

BRIEF DESCRIPTION OF THE DRAWINGS

FIG. 8A is a schematic view for describing difficulty of judgment of the most preferable base station; and FIG. 8B illustrates time course of waveforms of reception power of a mobile station A with respect to the case shown in FIG. 8A.

DETAILED DESCRIPTION OF THE INVENTION (Embodiment 1)

Figure 1:
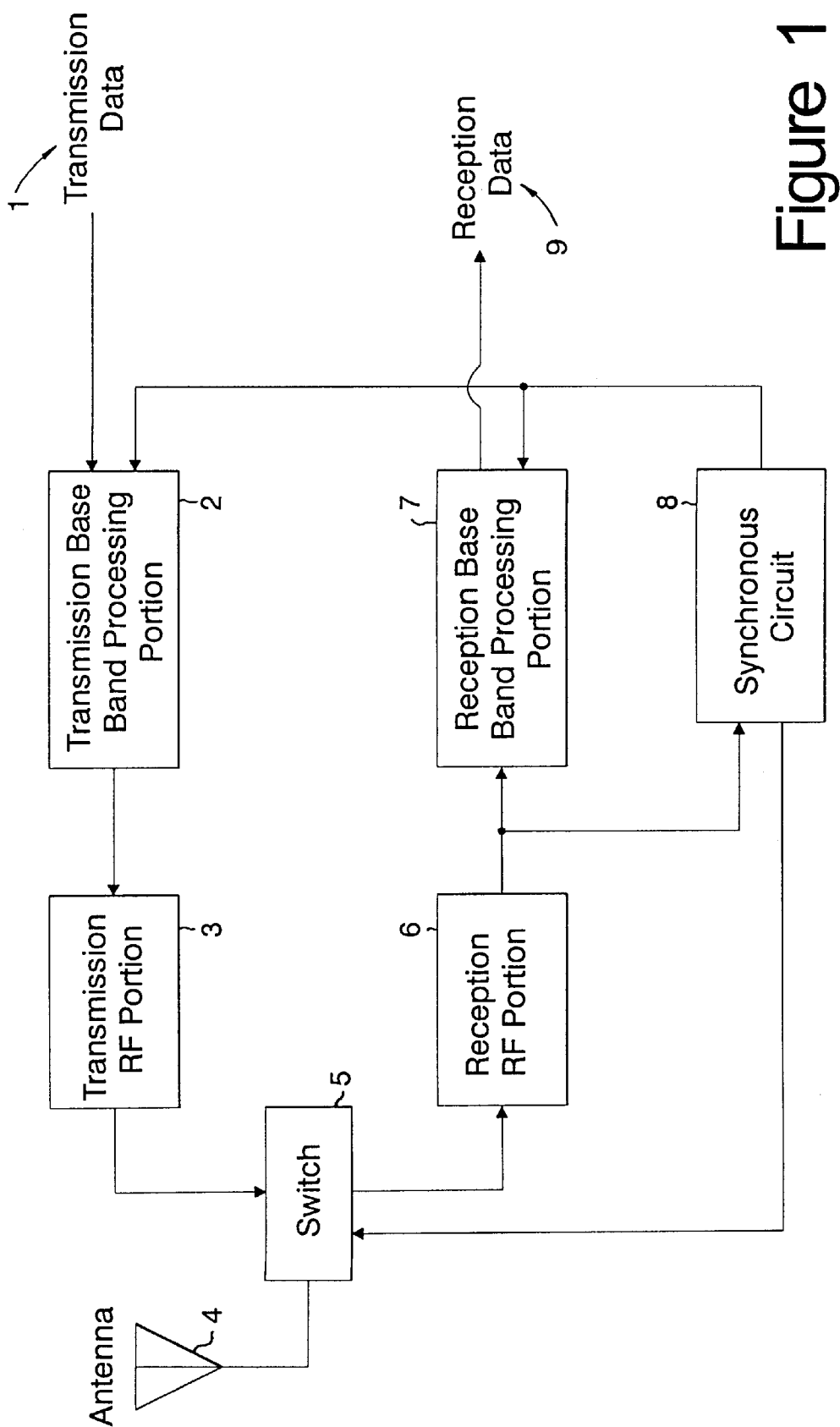
FIG. 1 is a block diagram illustrating construction of a mobile station of a mobile communication system according to a first embodiment of the present invention.

FIG. 1 illustrates construction of a mobile station of a mobile communication system according to a first embodiment of the present invention. In FIG. 1, numerals 1, 2, 3, 4, 5, 6, 7, 8, and 9 denote transmission data, a transmission base band processing portion, a transmission RF portion, an antenna, a switch for switching transmission/reception, a reception RF portion, a reception base band processing portion, a synchronous circuit, and reception data, respectively.

Next, operation of the embodiment is described in the following. At a time when the mobile station is to receive data in TDD, signals from a base station (not shown) are received by the antenna 4. The switch 5 is controlled by slot timing inputted from the synchronous circuit 8, and, at a time when the mobile station is to receive data, connects the antenna 4 with the reception RF portion 6, and thus, the received signals are inputted to the reception RF portion 6. In the reception RF portion 6, frequency conversion, AGC process, and demodulation are carried out, and the result is outputted to the reception base band processing portion 7 and the synchronous circuit 8. In the synchronous circuit 8, using the received signals, synchronization and reproduction of the timing of the spread code of the signals and synchronization and reproduction of the timing of the slot are carried out, and the timing is outputted to the transmission base band processing portion 2, the reception base band processing portion 7, and the switch 5. In the reception base band processing portion 7, despreading and decoding of the received signals are carried out using the timing inputted from the synchronous circuit 8 to acquire the reception data 9.

At a time when the mobile station is to transmit data in TDD, the transmission data 1 is inputted to the transmission base band processing portion 2, coding, frame assembling, and spreading are carried out, and the result is outputted to the transmission RF portion 3. In the transmission RF portion 3, modulation, frequency conversion, and amplification are carried out with respect to the input, and the result is outputted to the switch 5. At a time when the mobile station is to transmit data, the switch 5 connects the transmission RF portion 3 with the antenna 4, and thus, the output of the transmission RF portion 3 is transmitted from the antenna 4 to the base station.

Figure 2:
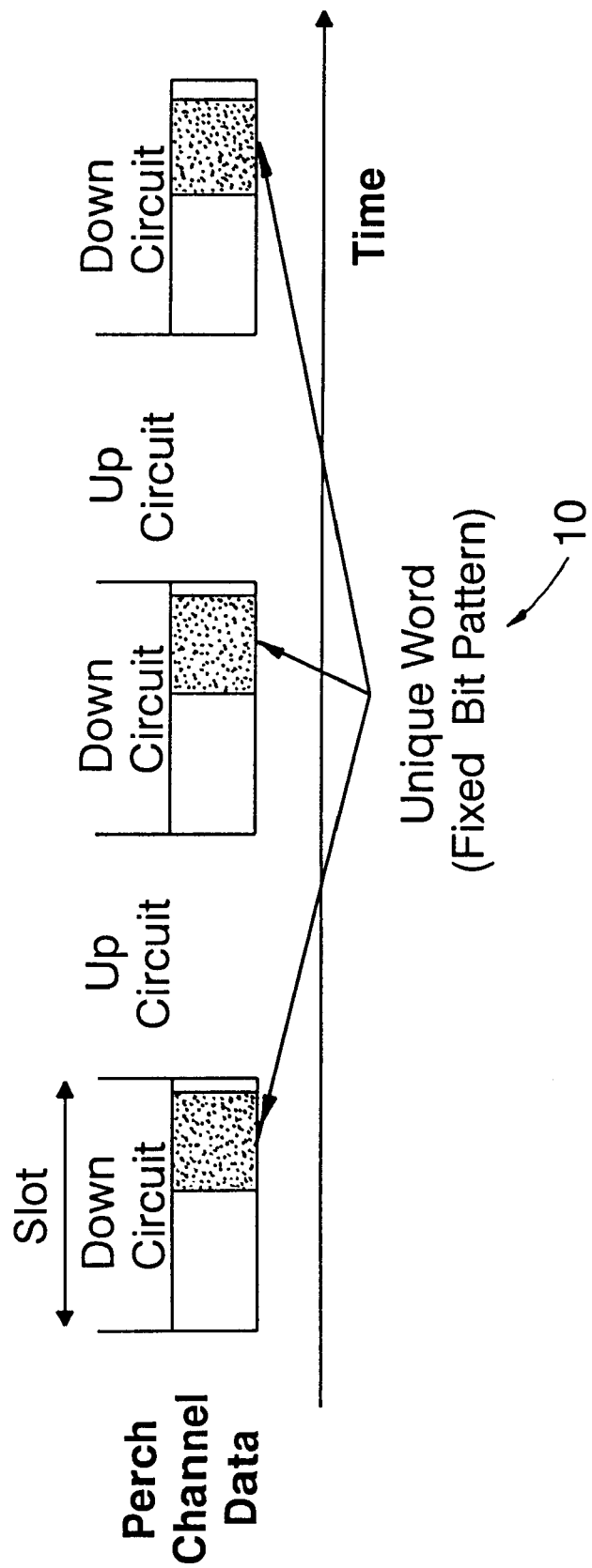
FIG. 2 illustrates construction of perch channel data according to the first embodiment of the present invention.
Figure 3A:
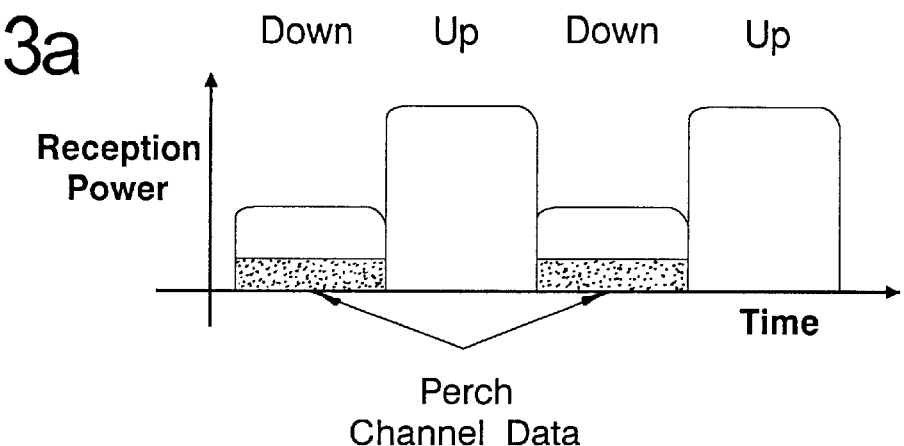
FIG. 3 illustrates waveforms of respective steps of reception according to the first embodiment of the present invention.
Figure 3B:
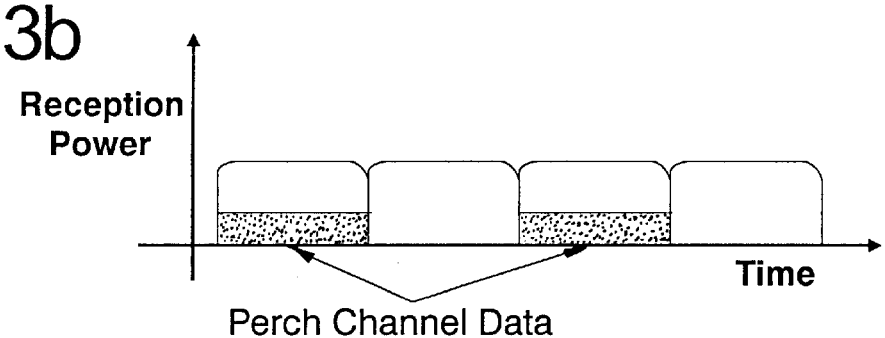
Figure 3C:
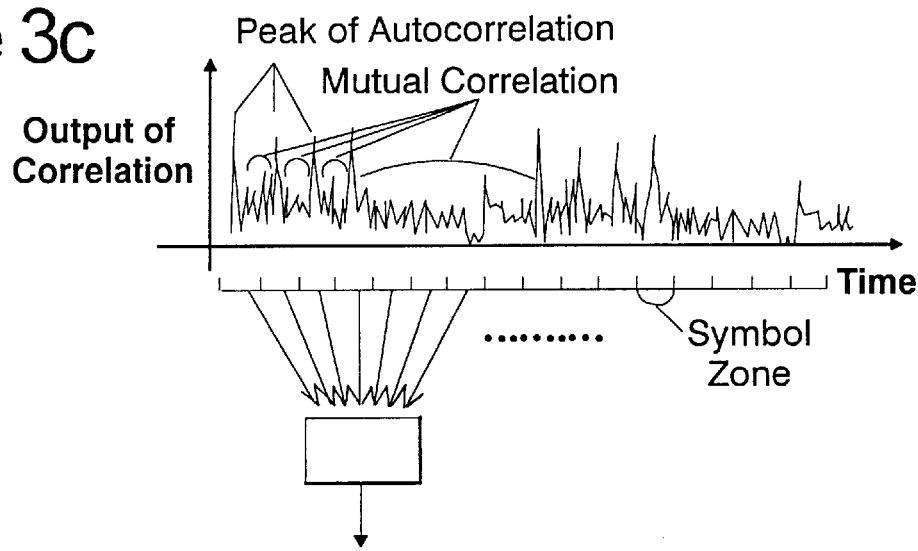
Figure 3D:
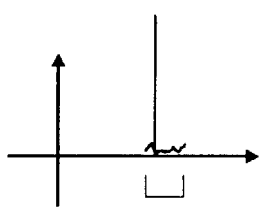

Next, operation when the mobile station is ON is described in the following. At a time when the base station is to transmit data in TDD, the base station always transmits perch channel data, the construction of which is shown in FIG. 2. As shown in FIG. 2, a unique word 10 of a fixed bit pattern is interpolated with respect to every slot. The perch channel data is spread only using a short code, and the kind of the spread code is known to the mobile station. During the mobile station is ON, the switch 5 maintains the connection between the antenna 5 and the reception RF portion 6 to continuously receive data. As shown in FIG. 3A, the received signal take the form of alternatively repeated down signals (from the base station to the mobile station) and up signals (from other mobile stations to the base station). As shown in FIG. 3B, by the AGC process in the reception RF portion 6, the received signals are made to be at a constant level over the time period, and then, inputted to the synchronous circuit 8. In the synchronous circuit 8, first, correlation is carried out with respect to the received signals using the short code used for spreading the perch channel data. As a result, as shown in FIG. 3C, a peak of autocorrelation appears at the timing of the short code of the perch channel data. However, since the signals after the correlation include large components of mutual correlation with other down signals and of mutual correlation with up signals other than the peak of the autocorrelation, it is difficult to estimate the short code, that is, symbol timing. Therefore, time integration is carried out with respect to the signals after the correlation with regard to every phase in the symbol zone. As a result, the autocorrelation is exaggerated by the integration, and as shown in FIG. 3D, the timing of the short circuit of the perch channel data clearly appears.

As described in the above, according to Embodiment 1, since the symbol timing reproduced by the synchronous circuit 8 is inputted to the reception base band processing portion 7, the perch channel data is reproduced from the received signals using the symbol timing in the reception base band processing portion 7, and the unique word is detected from the perch channel data to acquire the slot synchronization in the synchronous circuit 8, even signals where up signals and down signals are time-division multiplexed are received, the timing of the perch channel data can be extracted.

(Embodiment 2)

Figure 4:
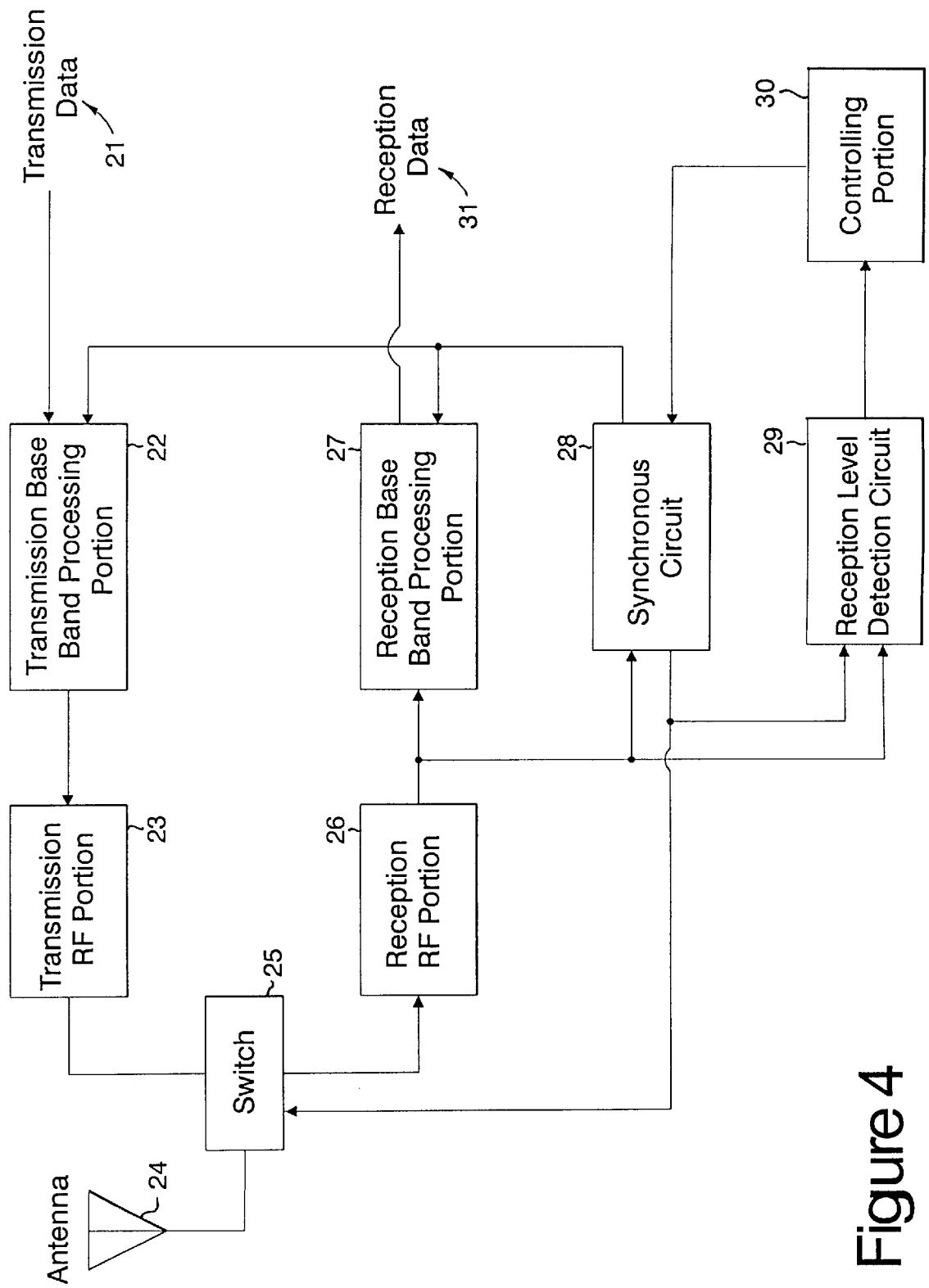
FIG. 4 is a block diagram illustrating construction of a mobile station of a mobile communication system according to a second embodiment of the present invention.

FIG. 4 illustrates construction of a mobile station of a mobile communication system according to a second embodiment of the present invention. In FIG. 4, numerals 21, 22, 23, 24, 25, 26, 27, 28, 29, 30, and 31 denote transmission data, a transmission base band processing portion, a transmission RF portion, an antenna, a switch for switching transmission/reception, a reception RF portion, a reception base band processing portion, a synchronous circuit, a reception level detection circuit, a controlling portion, and reception data, respectively.

Next, operation of the embodiment is described in the following. At a time when the mobile station is to receive data in TDD, signals from a base station (not shown) are received by the antenna 24. The switch 25 is controlled by slot timing inputted from the synchronous circuit 28, and, at a time when the mobile station is to receive data, connects the antenna 24 with the reception RF portion 26, and thus, the received signals are inputted to the reception RF portion 26. In the reception RF portion 26, frequency conversion, AGC process, and demodulation are carried out, and the result is outputted to the reception base band processing portion 27, the synchronous circuit 28, and the reception level detection circuit 29. In the synchronous circuit 28, under control by the controlling portion 30, using the received signals, synchronization and reproduction of the timing of the spread code of the signals and synchronization and reproduction of the timing of the slot are carried out, and the timing is outputted to the transmission base band processing portion 22, the reception base band processing portion 7, the switch 25, and the reception level detection circuit 29. In the reception level detection circuit 29, using the timing inputted from the synchronous circuit 28, the level of the desired wave component is detected from the received signals, and the result is outputted to the controlling portion 30. On the other hand, In the reception base band processing portion 27, despreading and decoding of the received signals are carried out using the timing inputted from the synchronous circuit 28 to acquire the reception data 31.

At a time when the mobile station is to transmit data in TDD, the transmission data 21 is inputted to the transmission base band processing portion 22, coding, frame assembling, and spreading are carried out, and the result is outputted to the transmission RF portion 23. In the transmission RF portion 23, modulation, frequency conversion, and amplification are carried out with respect to the input, and the result is outputted to the switch 25. The switch 25 connects the transmission RF portion 23 with the antenna 24 at a time when the mobile station is to transmit data, and thus, the output of the transmission RF portion 23 is transmitted from the antenna 24 to the base station.

Next, operation when judgment of the most preferable base station is made is described in the following. According to Embodiment 2, the timing of slots align with each other among a plurality of base stations, and means for transmitting perch channel data of the respective base stations are spread codes different between base stations adjacent to each other. After the mobile station is switched on, the controlling portion 30 arbitrarily selects one among the short codes used in the perch channel data of the respective base station, and controls the synchronous circuit 28 to acquire synchronization using the selected short code. The synchronous circuit 28 acquires, in the same way as in Embodiment 1, symbol synchronization and slot synchronization of the perch channel data of the base station (hereinafter referred to as the base station A) using the short code specified by the controlling portion 30. After the acquisition of synchronization, the synchronous circuit 28 outputs the reproduced symbol timing and slot timing to the reception level detection circuit 29. In the reception level detection circuit 29, the reception level of the perch channel data of the base station A is measured using the timing inputted from the synchronous circuit 28, and the result if outputted to the controlling portion 30.

Next, the controlling portion selects a short code of perch channel data used by another base station (hereinafter referred to as the base station B), and controls the synchronous circuit 20 to acquire synchronization. It is to be noted that, since the slot timing and the symbol timing of the base station A is already known and the slot timing is the same with respect to all the base stations, the difference between the reception timing of the base station A and that of the base station B is the sum of the synchronization accuracy of the timing of the base stations A and B and the radio wave propagation time difference due to the positional difference between the base stations A and B, which is extremely small, and therefore, the synchronization of the perch channel data of the base station B can be acquired in a short time. After the synchronization of the perch channel data of the base station B is acquired, the reception level detection circuit 29 measures the reception level of the perch channel data of the base station B in the same way as the case of the base station A, and the result is outputted to the controlling portion 30.

The above-described process is carried out with respect to short codes of perch channel data used by all the base stations, and the controlling portion 30 judges a base station using a short code of the maximum acquired reception level in the perch channel data to be the nearest.

As described in the above, according to Embodiment 2, in addition to the effect of Embodiment 1, when reception power levels from the respective base stations are measured, by using TDD timing of the base station the synchronization of which was first acquired when receiving data from the second and later base stations, judgment of the most preferable base station can be made at a high speed.

(Embodiment 3)

Figure 5:
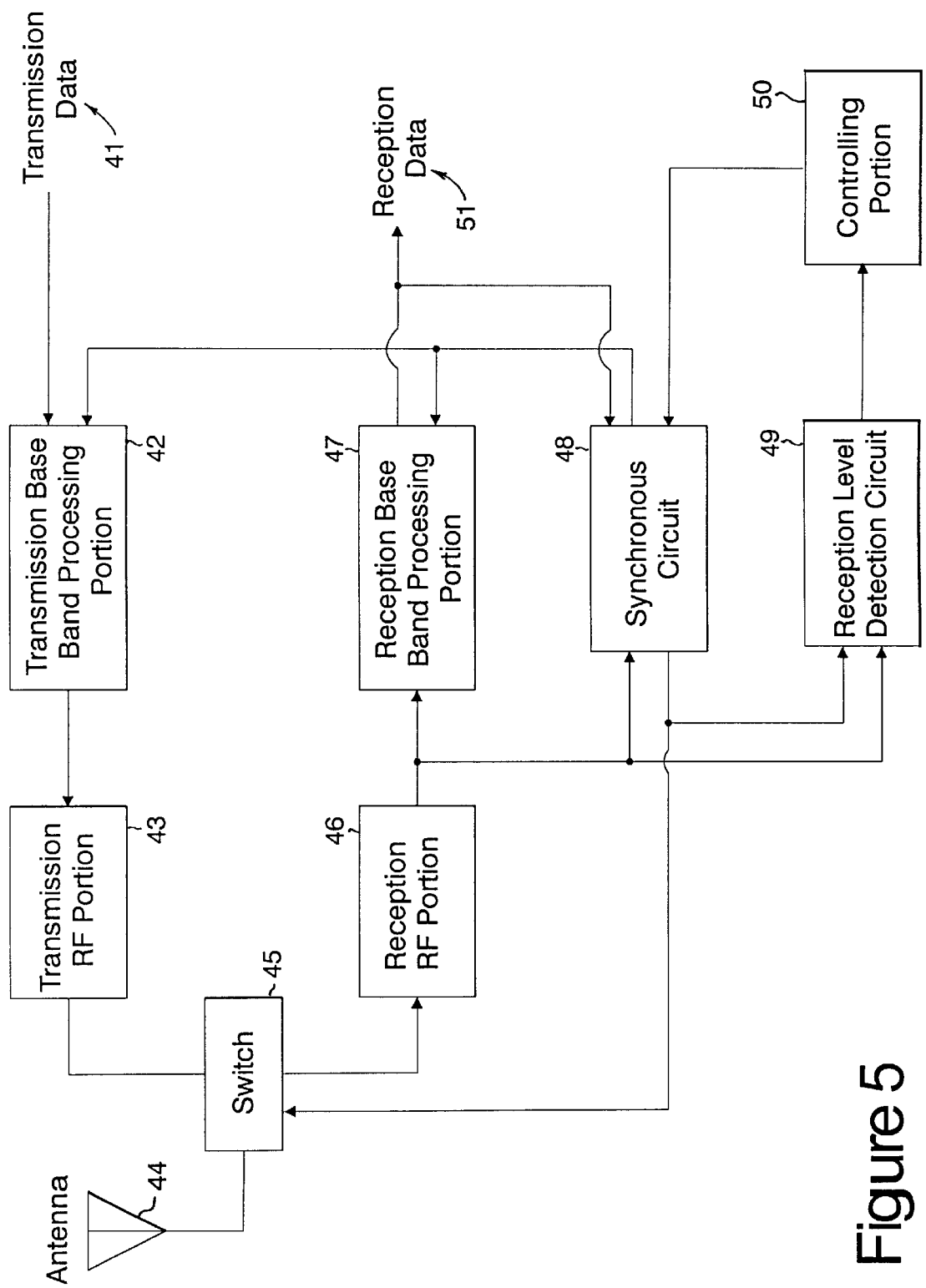
FIG. 5 is a block diagram illustrating construction of a mobile station of a mobile communication system according to a third embodiment of the present invention.

FIG. 5 illustrates construction of a mobile station according to a third embodiment of the present invention. In FIG. 5, numerals 41, 42, 43, 44, 45, 46, 47, 48, 49, 50, and 51 denote transmission data, a transmission base band processing portion, a transmission RF portion, an antenna, a switch for switching transmission/reception, a reception RF portion, a reception base band processing portion, a synchronous circuit, a reception level detection circuit, a controlling portion, and reception data, respectively.

Next, operation of Embodiment 3 is described in the following. In Embodiment 3, in addition to Embodiment 2, products of the short codes and long codes are used for communication channel data for transmitting user information. The long codes for down communication channel data are allotted to the base stations so as to be in one-to-one relation with the base stations, the same long code is used in cells of a base station, and each of the channel data is identified by the kind of the short code. A plurality of slots forms a frame, and the period and timing of the frame and the long code align with each other.

Figure 6:
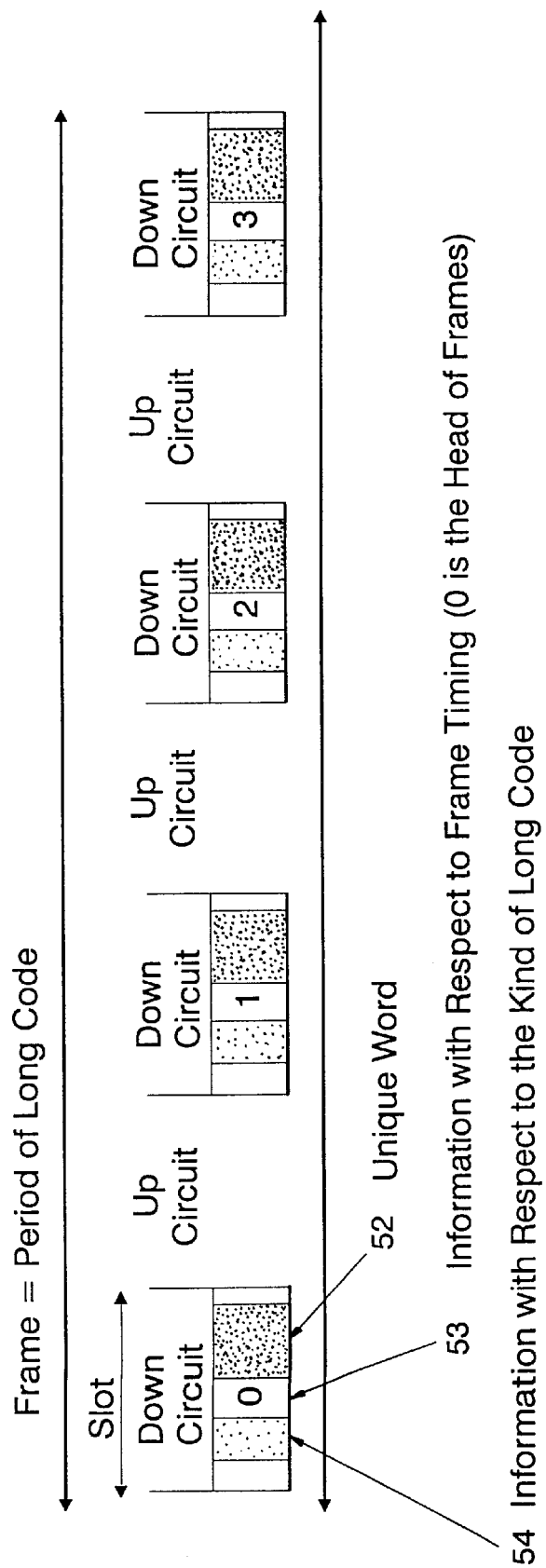
FIG. 6 illustrates construction of perch channel data according to the third embodiment of the present invention.
Figure 7A:
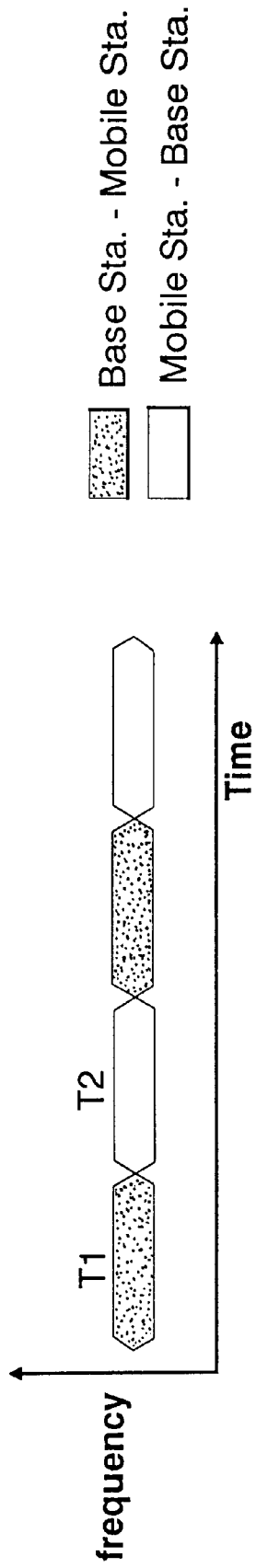
FIG. 7A conceptually illustrates TDD.
Figure 7B:
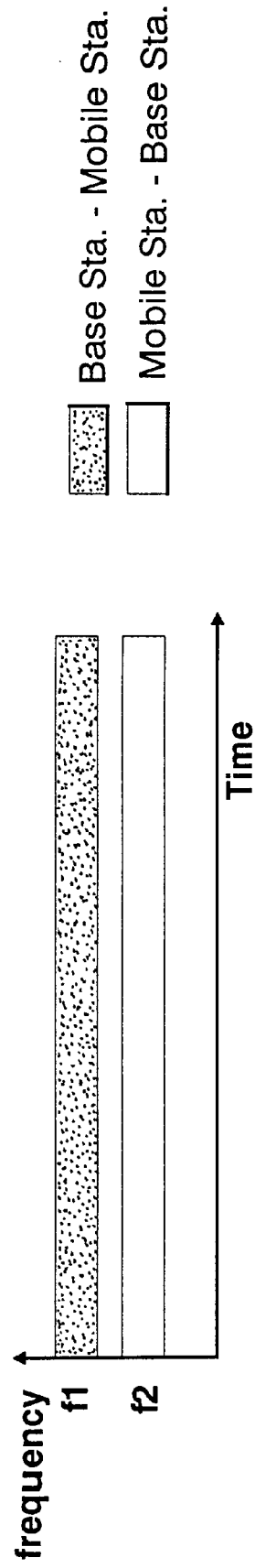
FIG. 7B conceptually illustrates FDD.

Further, as shown in FIG. 6, a base station interpolates in the perch channel data, in addition to a unique words 52, information 53 with respect to the frame timing and information 54 with respect to the kind of the long code used in the down communication channel data to transmit data.

Operation of the mobile station of the above-mentioned construction is described in the following. The initial synchronization and the judgment of the most preferable base station are carried out in the same way as in Embodiment 2. After the judgment of the most preferable base station, the synchronous circuit 48 maintains the synchronization with respect to the perch channel data of the base station judged to be the nearest, and the symbol timing and the slot timing are outputted to the reception base band processing portion 47. In the reception base band processing portion 47, correlation and decoding are carried out using the short code of the perch channel data with the inputted timing to acquire the reception data 51, and outputs the reception data 51 again to the synchronous circuit 48. In the synchronous circuit 48, frame synchronization is acquired from the frame timing information 53 interpolated in the inputted reception data 51, and the frame timing is outputted to the reception base band processing portion 47. The reception base band processing portion 47 carried out correlation and decoding of communication channel data addressed to its own mobile station from the perch channel data using the frame timing and the information 54 with respect to the kind of the long code interpolated in the reception data to acquire the reception data 51 of the communication channel.

As described in the above, according to Embodiment 3, by making the frame timing and the long code align with each other and transmitting information with respect to the frame timing and the kind of the long code via the perch channel, a mobile station can acquire synchronization of the long code at a high speed.

As is clear from the embodiments described in the above, according to the present invention, in a mobile communication system having mobile stations and base stations according to CDMA/TDD, spread codes to be used are, short codes different between base stations adjacent to each other with respect to the perch channel data, and, products of the short codes and the long codes with respect to communication channel for transmitting user information. Further, with respect to the perch channel data, a plurality of slots from a frame, and, a fixed bit pattern, frame timing information, and information with respect to the kinds of the long codes for synchronization are interpolated to every slot. In a mobile station, initial synchronization is carried out by receiving the perch channel data, the nearest base station is specified by measuring perch channel reception power level of all the base stations, and synchronization of the long code of the communication channel data is acquired using the frame timing and information with respect to the kind of the long code acquired when the perch channel data is received. Since the perch channel data is spread only using the short code, synchronization of the spread code can be acquired at a higher speed than in case of the long code. By detecting the unique word and specifying the reception zone of TDD, initial synchronization and judgment of the most preferable base station can be carried out at a high speed. Further, since the superframe of the perch channel data aligns with the period and timing of the long code, by receiving the perch channel data and reproducing the timing of the superframe in the mobile station, synchronization of the long code can be acquired easily.

What is claimed is:

1. A mobile communication system having a plurality of base stations and a plurality of mobile stations, the system comprising:

means for communicating between the base stations and the mobile stations according to a spread spectrum-direct sequence Code Division Multiple Access/Time Division Duplex (CDMA/TDD) technique, the minimum time unit of continuous transmission in TDD thereof being a slot, wherein each of said plurality of base stations includes:
      means for transmitting perch channel data including a unique word having a fixed bit pattern for synchronization wherein the fixed bit pattern is interpolated with respect to each slot; and each of said plurality of mobile stations performs an automatic gain control (AGC) function for controlling received signals at a constant level and includes:
      means for receiving perch channel data and acquiring slot synchronization and symbol synchronization.

2. The mobile communication system of claim 1, wherein:

the timing of slots align with each other among said plurality of base stations;

each of said means for transmitting perch channel data of each of said plurality of base stations uses spread codes different between base stations which are adjacent to each other; and each of said plurality of mobile stations includes:
      means for specifying the nearest base station by measuring a reception power level of perch channel data with respect to all of said plurality of base stations.

3. The mobile communication system of claim 2, wherein:

each of said plurality of base stations includes:
      means for transmitting perch channel data including frame information of a frame consisting of a plurality of slots being interpolated therein, and
      means for transmitting communication channel data for transmitting user information;
      each of said means for transmitting perch channel data uses as spread codes short codes different between base stations adjacent to each other, the period thereof being equal to transmission symbol length;
      each of said means for transmitting communication channel data uses as spread codes products of said short codes by long codes allotted so as to be in one-to-one relation with said base stations, the period thereof being equal to said frame; and each of said mobile stations includes:
      means for receiving frame information interpolated in perch channel data and acquiring frame synchronization, and
      means for acquiring synchronization of said long codes of communication channel data using the timing of the acquired frame.

4. The mobile communication system of claim 3, wherein:

each of said means for transmitting perch channel data of said plurality of base stations performs a function for transmitting information with respect to the kind of said long codes used in communication channel data, using perch channel data; and each of said plurality of mobile stations includes:
      means for acquiring synchronization of said long codes of communication channel data using said information with respect to the kind of said long codes acquired by receiving said perch channel data.

5. In a mobile communication system having mobile stations and base stations for communication according to a Code Division Multiple Access/Time Division Duplex (CDMA/TDD) technique, each of the base stations comprising:

means for transmitting perch channel data from the respective base station, wherein short codes different between adjacent base stations are used to spread codes and communication channel data carrying user information wherein products of short codes by long codes are used as spread codes, and means for interpolating into each slot in the perch channel data a fixed bit pattern for synchronization and information with respect to a long code from the respective base station, and wherein a plurality of slots form a frame.

6. In a mobile communication system having mobile stations and base stations for communication according to a Code Division Multiple Access/Time Division Duplex (CDMA/TDD) technique using perch channel data and communication channel data, each mobile station comprising:

means for carrying out initial synchronization by receiving perch channel data including a fixed bit pattern, means for specifying the nearest base station by measuring reception power levels of perch channel data with respect to all base stations, and means for acquiring synchronization of a spread code of the communication channel data by using frame timing acquired when perch channel data is received and using the perch channel data and the fixed bit pattern therein.

7. A mobile communication system comprising:

a plurality of mobile stations including:
      means for communicating according to a spread spectrum-direct sequence Code Division Multiple Access/Time Division Duplex (CDMA/TDD) technique, the minimum time unit of continuous transmission in TDD thereof being a slot, and a plurality of base stations including:
  means for transmitting perch channel data including a unique word for synchronization having a fixed bit pattern which is interpolated with respect to each slot.

8. A mobile communication system comprising:

a plurality of base stations and a plurality of mobile stations, each including:
  means for communicating with a plurality of base stations according to a spread spectrum-direct sequence Code Division Multiple Access/Time Division Duplex (CDMA/TDD) technique using perch channel data and communication channel data, the minimum time unit of continuous transmission in TDD thereof being a slot,
  automatic gain control (AGC) means for controlling received signals at a constant level and
  means for receiving the perch channel data including a fixed bit pattern, and acquiring slot synchronization and symbol synchronization using the fixed bit pattern.

* * * * *

UNITED STATES PATENT AND TRADEMARK OFFICE
CERTIFICATE OF CORRECTION

PATENT NO. : 6,144,650
DATED : November 7, 2000
INVENTOR(S) : Masatoshi Watanabe et al.

It is certified that error appears in the above-identified patent and that said Letters Patent is hereby corrected as shown below:

Column 10, Claim 5,
line 8, delete "to" and insert in its place --as--.

Signed and Sealed this

Twenty-sixth Day of June, 2001

*Attest:*

*Attesting Officer*

NICHOLAS P. GODICI
*Acting Director of the United States Patent and Trademark Office*